(12) United States Patent
Burau et al.

(10) Patent No.: US 7,081,720 B2
(45) Date of Patent: Jul. 25, 2006

(54) DRIVER CIRCUIT AND METHOD FOR DRIVING ELECTROLUMINESCENT LAMP TO EMIT LIGHT AT BRIGHTNESS SET LEVEL

(75) Inventors: Alf Burau, Aschaffenburg (DE); Heinrich Noll, Gross-Umstadt (DE); Peter Schilling, Karlstein (DE); Jürgen Wenning, Mainaschaff (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/854,960

(22) Filed: May 27, 2004

(65) Prior Publication Data

US 2005/0012471 A1    Jan. 20, 2005

(30) Foreign Application Priority Data

May 30, 2003   (EP) .................................. 03012423

(51) Int. Cl.
*H05B 37/02*   (2006.01)
*G09G 3/10*   (2006.01)
*G09G 3/30*   (2006.01)

(52) U.S. Cl. .................. 315/291; 315/169.3; 345/77
(58) Field of Classification Search ................ 315/151, 315/149, 156, 158, 169.3, 291; 250/205; 345/76, 77

See application file for complete search history.

(56) References Cited

U.S. PATENT DOCUMENTS

| 5,089,748 | A | | 2/1992 | Ihms ........................... 315/151 |
| 5,336,978 | A | * | 8/1994 | Alessio ..................... 315/169.3 |
| 5,493,183 | A | | 2/1996 | Kimball ...................... 315/156 |
| 5,747,938 | A | * | 5/1998 | Beard .......................... 315/291 |
| 5,783,909 | A | * | 7/1998 | Hochstein .................... 315/158 |
| 6,127,784 | A | * | 10/2000 | Grossman et al. .......... 315/158 |
| 6,337,541 | B1 | * | 1/2002 | Dickie et al. ............. 315/169.3 |
| 6,353,291 | B1 | * | 3/2002 | Borgogno et al. ........ 315/169.3 |
| 6,689,999 | B1 | * | 2/2004 | Haines et al. ................ 250/205 |

* cited by examiner

*Primary Examiner*—Don Wong
*Assistant Examiner*—Ephrem Alemu
(74) *Attorney, Agent, or Firm*—Cohen, Pontani, Lieberman & Pavane

(57) ABSTRACT

A method for driving an electroluminescent lamp to emit light at a brightness set level includes providing a variable bias voltage to the electroluminescent lamp. The variable bias voltage is increased with the duration of the on-time of the electroluminescent lamp. To stabilize the electroluminescent lamp at the brightness set level against aging, a closed loop control of the brightness of the electroluminescent lamp is applied, which is subject to said duration of the on-time the electroluminescent lamp.

8 Claims, 2 Drawing Sheets

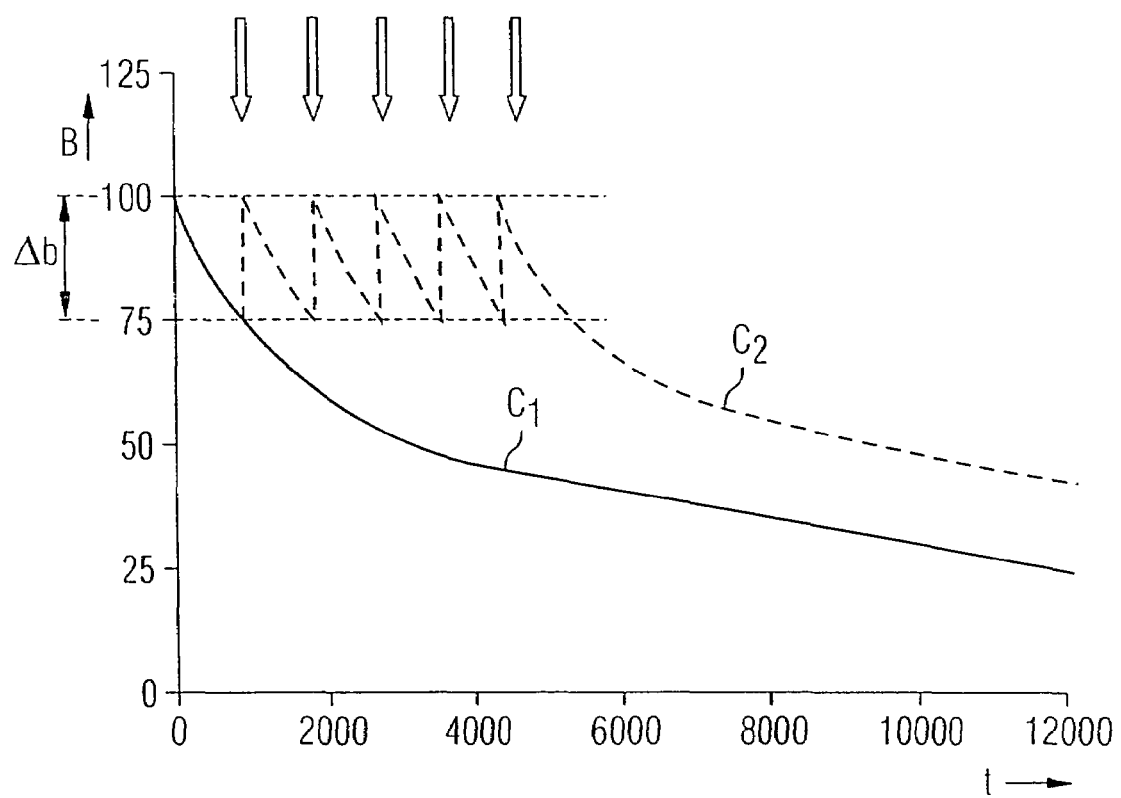

DRIVER CIRCUIT AND METHOD FOR DRIVING ELECTROLUMINESCENT LAMP TO EMIT LIGHT AT BRIGHTNESS SET LEVEL

This application claims the benefit of European patent application No. 03012423.4, filed on May 30, 2003.

BACKGROUND OF THE INVENTION

1. Field of the Invention

The invention relates to a method for driving an electroluminescent lamp to emit light at a brightness set level, in which a variable bias voltage is provided to said electroluminescent lamp, wherein the variable bias voltage is increased as a function of a duration of on-time of the electroluminescent lamp.

2. Description of the Related Art

An electroluminescent lamp that is used as a light source for backlighting displays or panels such as, for example, in automotive applications is a thin structure formed of a layer of electroluminescent material sandwiched between two conductive layers. When a sufficiently high bias voltage is applied across the two electrodes, a resulting electric field causes the intermediate electroluminescent layer to emit light that is visible through the transparent electrode. In general, the brightness of light emitted increases with the bias voltage, up to a maximum allowable voltage level. Apart from the change in brightness of the light emitted due to the change in bias voltage, electroluminescent lamps suffer from brightness decay which progresses in time due to aging. The aging process giving rise to the brightness decay occurs only during the actual on-time of the electroluminescent lamp in question, i.e., during the periods in which the electroluminescent lamp is actually emitting light. Accordingly, the half-life of the lamp must be distinguished from the life time of the lamp, wherein the half-life is defined as the actual on-time from initial turn-on until the lamp dims to half the original brightness at constant nominal bias setting and life time is defined as the actual on-time, elapsing from initial turn-on until the lamp dims to its lowest acceptable brightness level while adequately increasing the bias voltage up to its maximum allowable upper limit value. The lowest acceptable brightness level may be assumed to correspond to, e.g., 50% of the original brightness level. The original brightness level is hereinafter also referred to as brightness set level.

An example of a display driver circuit implementing an on-time dependent increase of the variable bias voltage of an electroluminescent lamp to emit light at a brightness set level being stabilized against aging as such is known from U.S. Pat. No. 5,493,183. This known display driver circuit provides open loop compensation of the typical on-time dependent, non-linear brightness decay of electroluminescent lamps by using an inverter controlled by a microprocessor. The microprocessor controls the inverter in accordance with a table containing data which is the inverse function of the non-linear brightness decay. The microprocessor tracks the total on-time of the electroluminescent lamp in question and selects the appropriate data from the table for driving the lamp. However, due to manufacturing tolerances, the non-linear brightness decay of electroluminescent lamps varies from one lamp to the other. The open loop control is fixed to the inverse function of the non-linear brightness decay stored and does not provide for any correction in mismatch between the stored data on the one hand and the actual brightness decay of the electroluminescent lamp used on the other hand. Due to this control mismatch the lamp may not be properly used to its full lifetime.

SUMMARY OF THE INVENTION

It is an object of the present invention to provide a method that provides for an automatic stabilization in brightness of an electroluminescent lamp, which is more accurate than the conventional prior art display driver circuit and which allows for a full lifetime use of the lamp.

The object of the present invention is met by a closed loop control of the brightness of the electroluminescent lamp responsive to a measured brightness of the lamp. The closed loop control is also responsive to the duration of the on-time of the electroluminescent lamp for stabilizing of the light intensity of the electroluminescent lamp at the brightness set level against aging.

In contrast to the prior art display driver circuit, the present invention is based on a closed loop concept in which the actual level of brightness as a bias control parameter is combined with an on-time weighting factor. The closed loop concept provides an automatic bias control which, due to the feedback mechanism in the loop, is accurately adapted to the specifics of the electroluminescent lamp, whereas stabilization of the light intensity of the electroluminescent lamp against aging is obtained with the on-time weighting factor of the bias control signal in the loop.

According to an embodiment of the present invention, the brightness set level is varied with the brightness in the ambience of the electroluminescent lamp.

The brightness set level may additionally or alternatively be varied with an adjustable dimming level signal.

The closed loop control of the brightness of the electroluminescent lamp may be subject to a temperature dependent weighting factor.

Furthermore, an intermittent reset of said closed loop control at the brightness set level may be effected.

The present invention also relates to an electroluminescent driver circuit implementing the method for driving an electroluminescent lamp to emit light at an original brightness level, i.e., a brightness set level. The inventive driver circuit includes a controllable power supply providing a variable bias voltage to the electroluminescent lamp and an on-time detector for detecting the total on-time of the electroluminescent lamp and deriving therefrom an on-time signal used to increase the bias voltage of said electroluminescent lamp with the duration of the detected on-time. The electroluminescent driver circuit includes an electroluminescent lamp brightness detector for deriving an electroluminescent lamp brightness signal varying with the brightness of the electroluminescent lamp, the lamp brightness signal being supplied to the controllable power supply through a signal combining circuit for combining the electroluminescent lamp brightness signal with the on-time signal for stabilization of the light intensity of the electroluminescent lamp at the brightness set level against aging.

The brightness set level may be provided by a brightness set level signal generator, wherein a first control input of the brightness set level signal generator is coupled to an output of an ambient brightness detector which detects the brightness in the ambience of the electroluminescent lamp. The ambient brightness detector supplies a variable ambient brightness level control signal for varying the brightness set level.

The brightness set level signal generator may include a second control input coupled to an output of a dimming potentiometer supplying an adjustable dimming level signal to said second input for a variation of the brightness set level.

The electroluminescent driver circuit according to the present invention may comprise an effective on-time signal generator having a first input coupled to the on-time detector and a second input coupled to a temperature sensor for generating an effective on-time signal corresponding to the on-time signal of the on-time detector varying with a temperature dependent weighting factor.

The closed loop control may be periodically reset at the brightness set level by a stepwise increase of the bias voltage of the controllable power supply within an allowable bias voltage range.

The periods between subsequent resets are preferably smaller than the time required for the brightness to decrease below a predetermined minimum electroluminescent lamp brightness level due to the aging dependent brightness decay.

The signal combining circuit may include an adder circuit providing a summation of said electroluminescent lamp brightness signal with said on-time signal.

The signal combining circuit may alternatively include a variable amplifier having a signal input receiving the electroluminescent lamp brightness signal from the electroluminescent lamp brightness detector and a gain control input receiving the on-time signal from the on-time detector.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 3 is a graph showing characteristic curves of brightness decay with and without applying an interruption mode according to the present invention.

DETAILED DESCRIPTION OF THE PRESENTLY PREFERRED EMBODIMENTS

In the following description, well known circuits have been shown in block diagram form so that the present invention is not obscured in unnecessary detail. For the most part, details concerning signal generation and processing have been omitted, inasmuch as such details are not necessary to obtain a complete understanding of the present invention and are within the skill of persons of ordinary skill in the relevant art.

Figure 1:
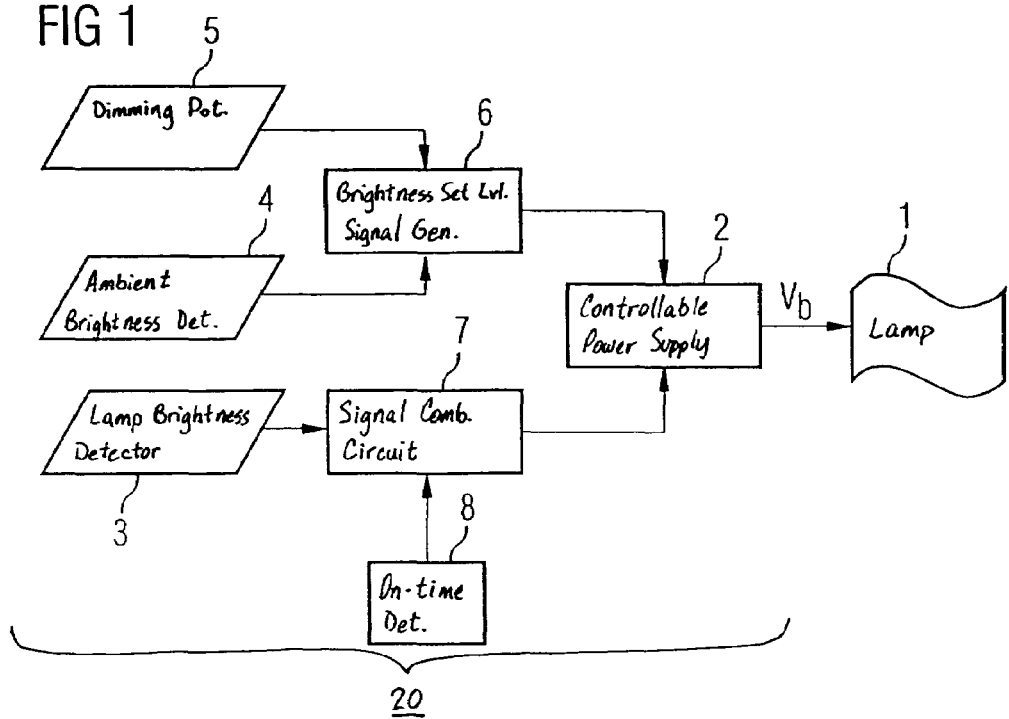
FIG. 1 is a block diagram of an electroluminescent driver circuit according to a first embodiment of the present invention.

FIG. 1 is a functional block diagram of a first embodiment of the present invention, in which an electroluminescent driver circuit 20 drives an electroluminescent lamp 1 to emit light at a brightness set level $B_{set}$ by providing thereto a variable bias voltage $V_b$. The electroluminescent driver circuit 20 comprises an electroluminescent lamp brightness detector 3 for detecting the light intensity or brightness of the electroluminescent lamp 1 and generates a lamp brightness signal varying with the brightness of the electroluminescent lamp 1. The lamp brightness signal is supplied as a bias voltage control signal to a controllable power supply 2 which generates the variable bias voltage $V_b$. Accordingly, the controllable power supply 2 is included in a closed brightness control loop in which variations in brightness of the electroluminescent lamp 1 are detected by the electroluminescent lamp brightness detector 3 and negatively fed back to the controllable power supply 2. The negative feedback of the variations in brightness allow a dynamic compensation of the variations, thereby stabilizing the brightness of the electroluminescent lamp 1 at a certain predetermined brightness set level. The brightness set level is determined by a brightness set level signal generator 6 which generates a brightness set level signal which is fed to the controllable power supply 2. The brightness set level signal generator 6 receives a first control input which is coupled to an output of an ambient brightness detector 4 for detecting the brightness in the ambience of the electroluminescent lamp 1 and deriving therefrom a variable ambient brightness level control signal. The brightness set level signal generator 6 also receives a second control input coupled to an output of a dimming potentiometer 5 supplying an adjustable dimming level signal to said second input. The brightness set level signal generator 6 combines the variable ambient brightness level control signal and the adjustable dimming level signal such that its output varies with both the brightness level control signal and the adjustable dimming level signal. This function of the brightness set level signal generator may be implemented by an adder circuit or a signal multiplier, such as a variable amplifier. This results in the brightness set level being adjusted to the brightness in the ambience of the electroluminescent lamp 1 as well as to a user's preferred brightness setting.

In accordance with the invention, the closed loop control of the brightness of the electroluminescent lamp 1 is responsive to the duration of the on-time of the electroluminescent lamp 1. For this purpose, the electroluminescent driver circuit 20 comprises an on-time detector 8 which tracks the total on-time of the electroluminescent lamp 1 and derives therefrom an on-time signal. The generation of the on-time signal may, for example, be derived in accordance with the disclosure of the above cited U.S. Pat. No. 5,493,183. The on-time signal is introduced into the closed loop by combining the on-time signal with the electroluminescent lamp brightness signal in a signal combining circuit 7 following the electroluminescent lamp brightness detector 3 in the loop.

The signal combining circuit 7 may include an adder circuit providing a summation of said electroluminescent lamp brightness signal with said on-time signal. Alternatively, the signal combining circuit may include a signal multiplier, such as a variable amplifier having a signal input receiving the electroluminescent lamp brightness signal from said electroluminescent lamp brightness detector 3 and a gain control input receiving the on-time signal from said on-time detector 8.

The controllable power supply 2 dynamically compensates any deviation of the brightness of the electroluminescent lamp 1 from the above predetermined brightness set level, including aging dependent brightness decay of the electroluminescent lamp 1, using the electroluminescent lamp brightness signal which is negatively fed back to the controllable power supply 2. In addition, aging dependent errors in the electroluminescent lamp brightness detector 3 are also being compensated by the controllable power supply 2 with the on-time signal from the on-time detector 8. The on-time detector 8 allows for the use of a non-ideal and cost-effective type of electroluminescent lamp brightness detector 3. Furthermore, the on-time detector 8 allows the so obtained dual control of the controllable power supply 2 to be operated either in a continuous mode, in which the controllable power supply is being controlled continuously, or in a discontinuous mode. In the discontinuous mode, the stabilization level of the brightness feed back control is periodically reset to its original level. In accordance with the invention, this is obtained by a stepwise increase in the bias voltage supplied by the variable power supply with a brightness correction step compensating the brightness decay of the electroluminescent lamp 1 from the original set level down to the minimum acceptable brightness level. The repetition frequency of this periodic reset is chosen accordingly, as will be explained in more detail with reference to FIG. 3.

Figure 2:
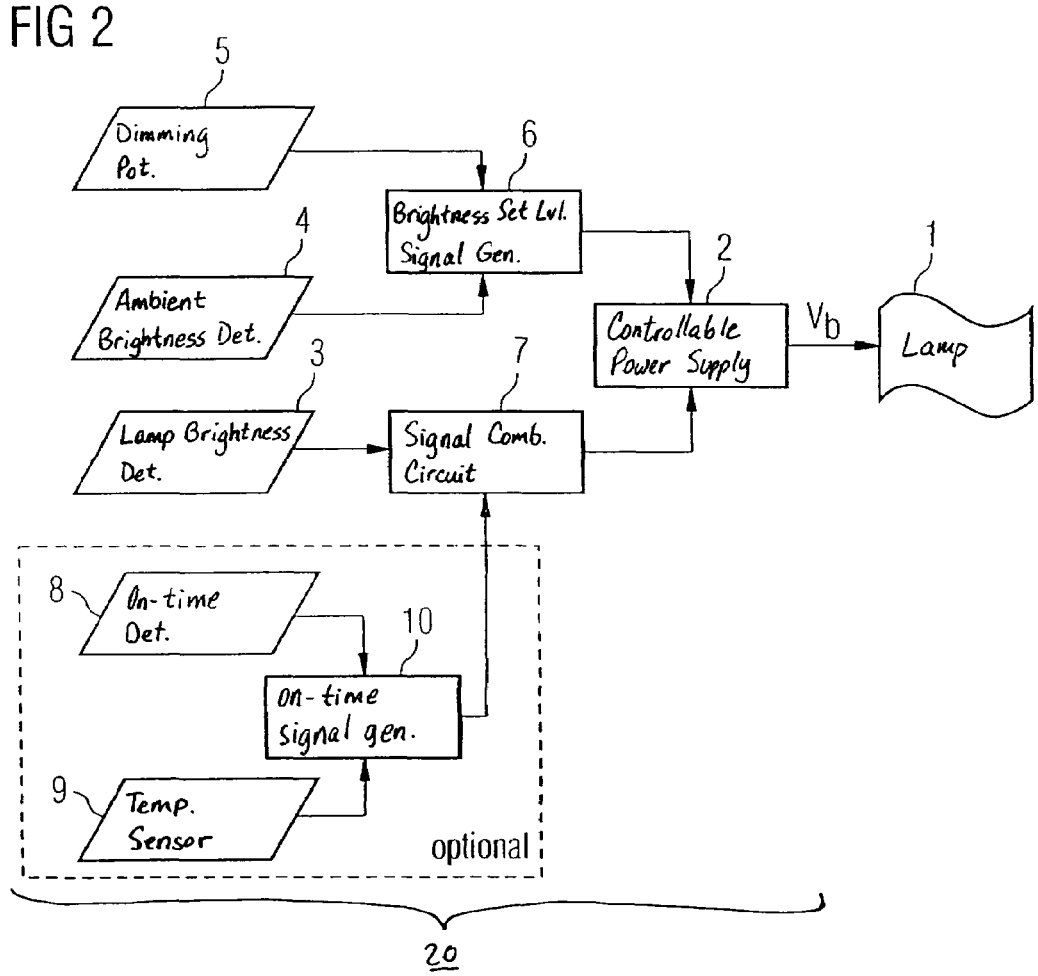
FIG. 2 is a block diagram of an electroluminescent driver circuit according to a second embodiment of the present invention.

FIG. 2 shows a functional block diagram of a second embodiment of the invention, which differs from the first embodiment of the invention of FIG. 1 in that it comprises an effective on-time signal generator 10 for generating an effective on-time signal corresponding to the on-time signal of the on-time detector 8 varying with a temperature dependent weighting factor. For this purpose, the effective on-time signal generator 10 is being provided with a first input coupled to the on-time detector 8 and a second input coupled to a temperature sensor 9. The temperature sensor 9 includes a thermometer sensing the temperature occurring actually during on-time of the electroluminescent lamp 1 and deriving therefrom a temperature signal providing the temperature dependent weighting factor. The effective on-time signal generator 10 may be implemented with an adder circuit providing a summation of the on-time signal from the on-time detector 8 and a temperature signal provided by the temperature sensor 9. Alternatively, the effective on-time signal generator 10 may be implemented with a signal multiplier, such as a variable amplifier having a signal input receiving the on-time signal from the on-time detector 8 and a gain control input receiving the temperature signal from the temperature sensor 9. The actually detected on-time signal provided by the on-time detector 8 may therefore be varied with the temperature dependent weighting factor by multiplication or by addition. The so obtained effective on-time signal is further processed in accordance with the on-time signal in the embodiment of FIG. 1.

FIG. 3 is a signal plot showing by way of example the effect of the invention on the brightness decay of an electroluminescent lamp when applying the invention in the above described discontinuous mode. Curve C1 shows the decrease in brightness B of an electroluminescent lamp in time t from an original brightness set level of 100 when applying an AC bias voltage with constant magnitude. Curve C2 shows the variation of brightness B of said electroluminescent lamp in time when applying the invention in discontinuous mode, i.e. with intermittent brightness detection and reset at the original brightness set level of 100 brightness dimension units, taking an electroluminescent lamp brightness level of 75 brightness dimension units as minimum acceptable level. For such reset, the magnitude of the AC bias voltage is being increased such that it causes the brightness set level to stepwise increase with a correction step $\Delta b$, in this example amounting to 25 brightness dimension units. This stepwise increase in bias voltage magnitude and brightness set level is periodically repeated until the magnitude of the AC bias voltage supplied to the electroluminescent lamp reaches the maximum allowable bias voltage specified for the lamp used. The periodic brightness reset may be initiated by a reset control signal derived from the on-time signal or the effective on-time signal as a time base. The periods between two consecutive resets is chosen to correspond to the time, during which the brightness set level decreases with the amount of the brightness set level correction step $\Delta b$ brightness dimension units, in the example of FIG. 3 such periods amounting to approximately 1000 time units. FIG. 3 clearly shows the extension in life time of the electroluminescent lamp, i.e., on-time use of the lamp at acceptable brightness level, obtained by the invention.

In practice, the periods between two consecutive resets are not fixed (the above indication of 1000 time units is only by way of example) but decrease as the brightness of the lamp decreases due to aging. The target period time between the consecutive resets shortens as the brightness decreases down to a value of 50 brightness dimension units.

Now, the present invention has hereabove been disclosed with reference to preferred embodiments thereof. Persons skilled in the art will recognize that numerous modifications and changes may be made thereto without exceeding the scope of the appended claims. In consequence, the embodiments should be considered as being illustrative, and no restriction should be construed from those embodiments, other than as have been recited in the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electroluminescent driver circuit for driving an electroluminescent lamp to emit light at a brightness set level, comprising:
   a closed control loop including an electroluminescent lamp brightness detector arranged to detect a brightness of the electroluminescent lamp and generate a lamp brightness signal in response to the detected brightness, and a controllable power supply arranged to generate a variable bias voltage for driving the electroluminescent lamp at the brightness set level in response to said lamp brightness signal;
   an on-time detector arranged to detect the total on-time of the electroluminescent lamp and generate therefrom an on-time signal; and
   a signal combining circuit arranged to generate an output signal combining the lamp brightness signal and the on-time signal, said controllable power supply increasing the variable bias in response to the on-time signal and receiving said output signal of said signal combining circuit for stabilization of the light intensity of the electroluminescent lamp at the brightness set level during aging of the electroluminescent lamp.

2. The electroluminescent driver circuit of claim 1, further comprising a temperature sensor generating a temperature dependent weighting factor and an effective on-time signal generator having a first input coupled to said on-time detector and a second input coupled to said temperature sensor, said effective on-time signal generator generating an effective on-time signal corresponding to said the on-time signal of the on-time detector and adjusted by the temperature dependent weighting factor.

3. The electroluminescent driver circuit of claim 1, wherein said signal combining circuit includes an adder circuit arranged to generate a summation of the electroluminescent lamp brightness signal with the on-time signal.

4. The electroluminescent driver circuit of claim 1, wherein said signal combining circuit includes a variable amplifier having a signal input receiving the electroluminescent lamp brightness signal from said electroluminescent lamp brightness detector and a gain control input receiving the on-time signal from said on-time detector.

5. The electroluminescent driver circuit of claim 1, further comprising:
an ambient brightness detector arranged for detecting the brightness in the ambience of the electroluminescent lamp and generating an output a variable ambient brightness level control signal; and
a brightness set level signal generator having a first control input coupled to the variable ambient brightness level control signal, said brightness set level signal generator varying the brightness set level in response to the variable ambient brightness level control signal.

6. The electroluminescent driver circuit of claim 5, further comprising a dimming potentiometer generating an adjustable dimming level signal, wherein said brightness set level signal generator includes a second control input coupled to the adjustable dimming level signal of said dimming potentiometer and varies the brightness set level in response to the adjustable dimming level signal.

7. The electroluminescent driver circuit of claim 1, further comprising means for periodically resetting the closed loop control at the brightness set level by a stepwise increase of the bias voltage of the controllable power supply within an allowable bias voltage range.

8. The electroluminescent driver circuit of claim 7, wherein periods between subsequent periodic resets are smaller than the time required for the brightness of said electroluminescent lamp to decrease below a minimum electroluminescent lamp brightness level due to aging dependent brightness decay.

* * * * *